United States Patent
Ito et al.

(10) Patent No.: US 8,709,143 B2
(45) Date of Patent: *Apr. 29, 2014

(54) WATER-BASED INK SET FOR INK-JET RECORDING, INK-JET RECORDING METHOD AND INK-JET RECORDING APPARATUS

(75) Inventors: Shinpei Ito, Nagoya (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 240 days.

This patent is subject to a terminal disclaimer.

(21) Appl. No.: 13/235,991

(22) Filed: Sep. 19, 2011

(65) Prior Publication Data

US 2012/0081454 A1 Apr. 5, 2012

(30) Foreign Application Priority Data

Sep. 30, 2010 (JP) ................................. 2010-223242

(51) Int. Cl.
*C09D 11/02* (2014.01)
*B41J 2/01* (2006.01)

(52) U.S. Cl.
USPC ...................................... 106/31.47; 347/100

(58) Field of Classification Search
USPC ........................ 106/31.47, 31.49; 347/20, 100
See application file for complete search history.

(56) References Cited

U.S. PATENT DOCUMENTS 7,611,571 B2 * 11/2009 Yamashita et al. ......... 106/31.47
7,854,797 B2 * 12/2010 Fujii et al. .................. 106/31.47

(Continued)

FOREIGN PATENT DOCUMENTS

JP 03-103484 4/1991
JP 2000-303009 10/2000

(Continued)

OTHER PUBLICATIONS

Notice of Reasons for Rejection of corresponding Japanese Patent Application No. 2010-223242, dated Jan. 28, 2014.

*Primary Examiner* — Helene Klemanski
(74) *Attorney, Agent, or Firm* — Banner & Witcoff, Ltd.

(57) ABSTRACT

A water-based ink set for ink-jet recording includes: a water-based black ink containing a black colorant, water, and a water-soluble organic solvent; and a water-based cyan ink containing a cyan colorant, water, and a water-soluble organic solvent; wherein the black colorant includes a self-dispersible carbon black modified by at least one of a carboxyl group and a sulfo group; and the cyan colorant includes a dye represented by general formula (1):

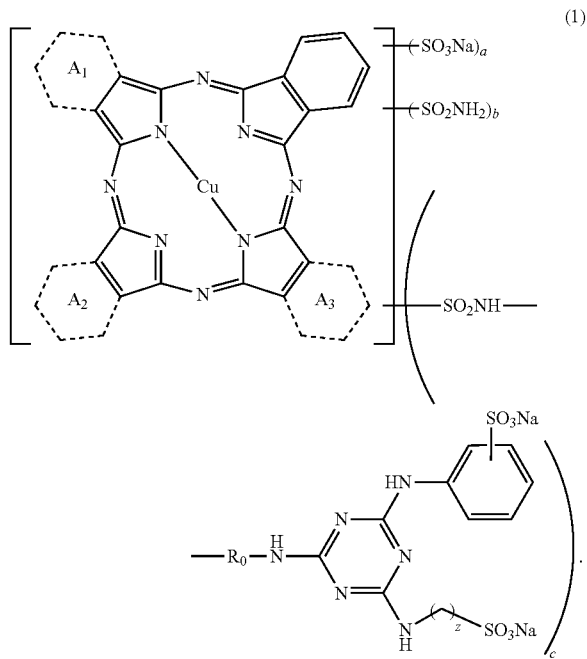

5 Claims, 2 Drawing Sheets (56) References Cited

U.S. PATENT DOCUMENTS

| | | | |
|---|---|---|---|
| 8,062,412 B2 * | 11/2011 | Aoyama et al. | 106/31.89 |
| 8,226,222 B2 * | 7/2012 | Kajiura et al. | 347/100 |
| 8,430,953 B2 * | 4/2013 | Hayashida et al. | 106/31.47 |
| 8,460,449 B2 * | 6/2013 | Goto et al. | 106/31.47 |
| 2004/0257420 A1 | 12/2004 | Ichizawa et al. | |
| 2006/0201380 A1 | 9/2006 | Kowalski et al. | |
| 2007/0100023 A1 | 5/2007 | Burns et al. | |
| 2007/0100024 A1 | 5/2007 | Burns et al. | |
| 2008/0241398 A1 | 10/2008 | Kato et al. | |
| 2010/0112218 A1 | 5/2010 | Fujii et al. | |
| 2011/0128331 A1 | 6/2011 | Hayashida et al. | |
| 2011/0143106 A1 * | 6/2011 | Patel | 106/31.49 |
| 2012/0081453 A1 * | 4/2012 | Tsuzaka et al. | 106/31.48 |

FOREIGN PATENT DOCUMENTS

| | | |
|---|---|---|
| JP | 2005008690 A | 1/2005 |
| JP | 2008-524400 | 7/2008 |
| JP | 2008-246821 | 10/2008 |
| JP | 2009-515007 | 4/2009 |
| JP | 2010-037505 | 2/2010 |
| JP | 2011-111603 A | 6/2011 |
| JP | 2011-111604 A | 6/2011 |
| JP | 2011-111605 A | 6/2011 |
| JP | 2011-111606 A | 6/2011 |
| WO | 2007-053563 | 5/2007 |
| WO | 2007-053564 | 5/2007 |
| WO | 2008111635 A1 | 9/2008 |

* cited by examiner

WATER-BASED INK SET FOR INK-JET RECORDING, INK-JET RECORDING METHOD AND INK-JET RECORDING APPARATUS

CROSS REFERENCE TO RELATED APPLICATION

The present application claims priority from Japanese Patent Application No. 2010-223242 filed on Sep. 30, 2010 the disclosure of which is incorporated herein by reference in its entirety.

BACKGROUND OF THE INVENTION

1. Field of the Invention

The present invention relates to a water-based ink set for ink-jet recording, an ink-jet recording method and an ink-jet recording apparatus.

2. Description of the Related Art

In the recent years, a water-based ink set for ink-jet recording which includes a pigment black ink and a dye color ink is widely used. As a water-based cyan ink used in such an ink set, an ink is known which contains a cyan dye such as C. I. Acid Blue 74, C. I. Acid Blue 9, etc. The above-described cyan dye, however, does not have sufficient light resistance (light stability). For this reason, a copper phthalocyanine-based dye such as C. I. Direct Blue 86, C. I. Direct Blue 199, etc. is widely used in commercial-available water-based cyan inks. These general copper phthalocyanine-based dyes have an excellent light resistance as compared with magenta and yellow dyes, but have a problem such that the copper phthalocyanine-based dyes easily fade and/or discolor when contacting with ozone, which results in discoloration and optical density reduction in a recorded matter. For this reason, a copper phthalocyanine-based dye with higher or enhanced ozone resistance has been proposed.

The water-based ink set is required to have the excellent light resistance and ozone resistance of the dye cyan ink and further to have excellent jetting stability of the cyan dye ink as well as excellent non-aggregation property between the pigment black ink and the dye cyan ink. The term "non-aggregation property" means, for example, in an ink-jet recording apparatus any aggregation between the pigment black ink and the dye cyan ink does not occur even if the pigment black ink and the dye cyan ink are brought into contact upon performing wiping of a nozzle-formed surface in an ink-jet head with a wiper member.

In view of the above situation, an object of the present invention is to provide a water-based ink set for ink-jet recording including a pigment black ink and a dye cyan ink with excellent light resistance, ozone resistance and jetting stability of the dye cyan ink and also excellent non-aggregation property between the pigment black ink and the dye cyan ink.

SUMMARY OF THE INVENTION

According to a first aspect of the present teaching, there is provided a water-based ink set for ink jet recording, including:

a water-based black ink containing a black colorant, water, and a water-soluble organic solvent; and a water-based cyan ink containing a cyan colorant, water, and a water-soluble organic solvent;

wherein the black colorant includes a self-dispersible carbon black modified by at least one of a carboxyl group and a sulfo group; and the cyan colorant includes a dye represented by general formula (1):

in the general formula (1), each of rings $A_1$, $A_2$ and $A_3$ is a benzene ring, 2,3-pyridine ring or 3,2-pyridine ring;

at least one of the rings $A_1$, $A_2$ and $A_3$ is the 2,3-pyridine ring or the 3,2-pyridine ring, and the rings $A_1$, $A_2$ and $A_3$ are identical to or different from one another;

"a" satisfies $0 \leq a \leq 4$, "b" satisfies $0 \leq b \leq 4$ and "c" satisfies $0 \leq c \leq 4$, and a sum of "a", "b", "c" satisfies $0 \leq a+b+c \leq 4$;

"z" is an integer satisfying $1 \leq z \leq 3$; and $R_0$ is a straight chain alkyl group having 1 to 6 carbon atoms.

According to a second aspect of the present teaching, there is provided an ink-jet recording method for performing recording on a recording medium including discharging, onto the recording medium, the water-based black ink and the water-based cyan ink of the water-based ink set for ink-jet recording of the first aspect.

According to a third aspect of the present teaching, there is provided an ink-jet recording apparatus which performs recording on a recording medium including:

an ink-set accommodating section which accommodates the water-based ink set for ink-jet recording of the first aspect; and an ink discharge mechanism which discharges, onto the recording medium, each of the water-based black ink and the water-based cyan ink of the water-based ink set for ink-jet recording.

DESCRIPTION OF THE PREFERRED EMBODIMENTS

An explanation will be given about a water-based ink set for ink-jet recording (hereinafter also referred to simply as "water-based ink set" or "ink set") of the present teaching. The water-based ink set of the present teaching includes a water-based black ink and a water-based cyan ink.

(Water-Based Black Ink)

As described above, the water-based black ink contains a black colorant, water and a water-soluble organic solvent. The black colorant includes a self-dispersible carbon black modified by at least one of a carboxyl group and a sulfo group. In the present teaching, an ink set with excellent non-aggregation property can be obtained by combining the self-dispersible carbon black modified by at least one of the carboxyl group and the sulfo group (hereinafter referred to also as "specific group-modified self-dispersible carbon black") with the above-described specific water-based cyan ink. The specific group-modified self-dispersible carbon black can be prepared for example by processing the carbon black, which will be described later on, with the method described in Published Japanese Translation of PCT International Publication for Patent Application No. 2008-524400. Further, it is allowable to use a commercially available product of the specific group-modified self-dispersible carbon black. For example, the commercially available product is exemplified by "CAB-O-JET (trade name) 200" and "CAB-O-JET (trade name) 300" produced by Cabot Specialty Chemicals, etc. The water-based black ink may contain a polymeric pigment dispersant; or it is allowable that the water-based black ink does not contain any polymeric pigment dispersant. In a case that the water-based black ink contains the polymeric pigment dispersant, it is preferable that the polymeric pigment dispersant is contained in the water-based black ink in an amount to an extent not affecting the viscosity of the water-based black ink. As described above, since the water-based black ink of the present teaching uses the self-dispersible carbon black as described above, there is not any problem of the increase in viscosity which would be otherwise caused by the polymeric pigment dispersant; and the water-based black ink of the present teaching has excellent jetting (discharge) stability and storage stability.

As a carbon black usable as the material for the specific group-modified self-dispersible carbon black can be exemplified, for example, by furnace black, lamp black, acetylene black, and channel black. In particular, the carbon black, which is suitable for the above-described treatment, includes, for example, "MA8" and "MA100" produced by Mitsubishi Chemical Corporation and "Color Black FW200" produced by Degussa. Note that the specific group-modified self-dispersible carbon black may be a self-dispersible carbon black modified by any one of a carboxyl group and a sulfo group, and may be a self-dispersible carbon black modified by both of the carboxyl group and the sulfo group.

The solid content blending amount (pigment solid content) of the specific group-modified self-dispersible carbon black with respect to the entire water-based black ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight.

The black colorant may include a pigment, a dye, etc. which is/are different from the specific group-modified self-dispersible carbon black, in addition to the specific group-modified self-dispersible carbon black, within a range in which the effect of the present teaching is not deteriorated.

The water is preferably ion-exchanged water or pure water (purified water). The blending ratio of water (water ratio) with respect to the total amount (entire amount) of the water-based black ink is, for example, 10% by weight to 90% by weight, and is preferably 40% by weight to 80% by weight. The water ratio may be, for example, the balance of the ink, excluding other components.

The water-soluble organic solvent includes, for example, a humectant which prevents the water-based black ink from drying at an end of the nozzle in the ink-jet head and a penetrant which adjusts the drying speed of the water-based black ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols (polyalchonols) such as polyalkylene glycol, alkylene glycol, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylenes glycol, diethylene glycol, triethylene glycol, dipropylene glycol, tripropylene glycol, thiodiglycol, and hexylene glycol. It is allowable that only one type of the humectant as described above is used, or two or more types of the humectants are used. Among the above-described humectants, it is preferable to use polyvalent alcohols such as alkylene glycol and glycerol.

The blending amount of the humectant with respect to the entire water-based black ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycoln-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one type of the penetrant as described above is used, or two or more types of the penetrants are used.

The blending amount of the penetrant with respect to the entire water-based black ink is, for example, 0% by weight to 20% by weight, is preferably 0.1% by weight to 15% by weight, and is more preferably 0.5% by weight to 10% by weight.

The water-based black ink may further contain a conventionally known additive, if necessary. The additive includes, for example, surfactants, pH-adjusting agents, viscosity-adjusting agents, surface tension-adjusting agents, and fungicides (mildewproofing agents). The viscosity-adjusting agents include, for example, polyvinyl alcohol, cellulose, water-soluble resin, etc.

The water-based black ink can be prepared, for example, by uniformly or homogennously mixing a black colorant, water, and a water-soluble organic solvent, and optionally other additive component(s) as necessary by a conventionally known method, and then by removing undissolved matter(s) by a filter or the like.

(Water-Based Cyan Ink)

As described above, the water-based cyan ink contains a cyan colorant, water, and a water-soluble organic solvent. The cyan colorant includes a dye represented by the general formula (1). By containing the dye represented by the general formula (1) in the water-based cyan ink, it is possible to obtain a water-based cyan ink with excellent jetting stability, light resistance and ozone resistance. In general, the ozone resistance of the water-based cyan ink is enhanced by increasing the association property of dye molecules in the water-based cyan ink. On the other hand, however, the water-based cyan ink having a great association property of the dye molecules has such a problem or defect that solubility to the water is low. Accordingly, in a case that a dye having a high association property of the dye molecules is used as the cyan dye for the cyan ink for ink-jet recording, there is a concern that any problem would occur regarding the long-term storage stability and/or the vaporizability of the ink, due to the low solubility with respect to the water. Namely, there is concern that an ink using a dye with low solubility to water would have an increased viscosity when even a small amount of the water is evaporated; and that the ink with excessively increased viscosity would have a great channel resistance in an ink-jet head, which would in turn make it hard to jet or discharge the ink stably. On the other hand, since the dye represented by the general formula (1) has high association of the dye molecules and excellent ozone resistance, as well as satisfactory solubility to the water, there is an effect that the jetting stability is also excellent. This mechanism, however, is assumption and does not limit the present teaching in any manner.

The dye represent by the general formula (1) may be a compound in which all of the rings $A_1$, $A_2$, and $A_3$ are 2,3-pyridine ring or 3,2-pyridine ring; may be a compound in which two of the rings $A_1$, $A_2$, and $A_3$ are the 2,3-pyridine ring or the 3,2-pyridine ring, and the remaining one of the rings $A_1$, $A_2$, $A_3$ is a benzene ring; and may be a compound in which one of the rings $A_1$, $A_2$, and $A_3$ is the 2,3-pyridine ring or the 3,2-pyridine ring, and the remaining two of the rings $A_1$, $A_2$, $A_3$ are the benzene ring. The dye represented by the general formula (1) may be composed singly one of the above-described compounds, or may be a mixture containing not less than two kinds of the above-described compounds.

A specific and preferable example of the dye represented by the general formula (1) is exemplified by the following compounds represented by chemical formulae (1-A) to (1-E).

(Chemical Formula 1-A)

(1-A)

In the chemical formula (1-A), each of rings $A_1$, $A_2$ and $A_3$ is independently a 2,3-pyridine ring and/or a 3,2-pyridine ring; and "a" is 1.0, "b" is 1.8, "c" is 1.2, and each of the "a", "b", "c" is an average value in a mixture.

(Chemical Formula 1-B)

(1-B)

In the chemical formula (1-B), each of rings $A_1$ and $A_2$ is independently a 2,3-pyridine ring and/or a 3,2-pyridine ring; ring $A_3$ is a benzene ring; and "a" is 2.4, "b" is 0.6, "c" is 1.0, and each of the "a", "b", "c" is an average value in a mixture.

(Chemical Formula 1-C)

(1-C)

In the chemical formula (1-C), each of rings $A_1$, $A_2$ and $A_3$ is independently a 2,3-pyridine ring and/or a 3,2-pyridine ring; and "a" is 3.0, "b" is 0.2, "c" is 0.8, and each of the "a", "b", "c" is an average value in a mixture.

(Chemical Formula 1-D)

(1-D)

In the chemical formula (1-D), a ring $A_1$ is a benzene ring; each of rings $A_2$ and $A_3$ is independently a 2,3-pyridine ring and/or a 3,2-pyridine ring; and "a" is 1.8, "b" is 0.9, "c" is 1.3, and each of the "a", "b", "c" is an average value in a mixture.

(Chemical Formula 1-E)

(1-E)

In the chemical formula (1-E), each of rings $A_1$, $A_2$, and $A_3$ is independently a 2,3-pyridine ring and/or a 3,2-pyridine ring; and "a" is 1.1, "b" is 1.3, "c" is 1.6, and each of the "a", "b", "c" is an average value in a mixture.

(Chemical Formula 1-F)

(1-F)

In the chemical formula (1-F), each of rings $A_1$ and $A_3$ is independently a 2,3-pyridine ring and/or a 3,2-pyridine ring, and a ring $A_2$ is a benzene ring; and "a" is 0, "b" is 1.8, "c" is 2.2, and each of the "a", "b", "c" is an average value in a mixture.

The dye represented by the general formula (1) may be produced according to a conventionally known method. An example of the method for producing the dye represented by the general formula (1) is as follows.

That is, first, a copper porphyrazine compound represented by the following structural formula (11) is synthesized. The copper porphyrazine compound represented by the structural formula (11) is obtained, for example, by reaction of a nitrogen-containing heteroaromatic ring (at least one of a 2,3-pyridine ring and a 3,2-pyridine ring) dicarboxylic acid derivative and a phthalic acid derivative in the presence of a catalyst and a copper compound. By changing the molar ratio in the reaction of the nitrogen-containing heteroaromatic ring dicarboxylic acid derivative and the phthalic acid derivative, it is possible to adjust the number of nitrogen-containing heteroaromatic rings and the number of benzene rings in $A_1$, $A_2$, and $A_3$. The nitrogen-containing heteroaromatic ring dicarboxylic acid derivative is exemplified by a 6-membered nitrogen-containing heteroaromatic ring dicarboxylic acid derivative having, at adjacent two positions, carboxyl groups or reactive groups derived therefrom (for example, an acid amide group, an imide group, an acid anhydride group, a carbonitrile group, and the like), etc. Examples of the method for synthesizing the copper porphyrazine compound include conventionally known methods such as the nitrile method, the Wyler method, and the like.

(Chemical Structural Formula 11)

(11)

Next, a copper chlorosulfonylporphyrazine compound represented by the following structural formula (12) is obtained by chlorosulfonation of the copper porphyrazine compound represented by the structural formula (11) in chlorosulfonic acid or by sulfonation of the copper porphyrazine compound represented by the structural formula (11) in sulfuric acid or fuming sulfuric acid followed by conversion of the sulfo group into a chlorosulfone group with a chlorinating agent.

(Chemical Structural Formula 12)

(12)

Next, the dye represented by the general formula (1) is obtained by reaction of the thus obtained copper chlorosulfonylporphyrazine compound and organic amine represented by the following structural formula (13) in the presence of an aminating agent (ammonia or an ammonia generating compound) in an aqueous solvent under reaction conditions in which the pH is from about 8 to about 10, the temperature is from about 5° C. to about 70° C., and the reaction time is from about 1 hour to about 20 hours. As the aminating agent, ammonia or a compound that generates ammonia at the time of the reaction (ammonia generating compound) may be used. Examples thereof include ammonium salts such as ammonium chloride, ammonium sulfate, and the like; urea; ammonia water; ammonia gas; and the like. In the organic amine represented by the structural formula (13), "X" and "Y" each represent a hydrogen atom or sodium. "X" and "Y" each may be ionized in the aqueous solvent (may become $H^+$ or $Na^+$). The organic amine may be produced by a conventionally known method.

(Chemical Structural Formula 13)

(13)

The thus obtained dye represented by the general formula (1) may be separated by filtration or the like after aciding out or salting out. Salting out may be carried out, for example, under acidic to alkali conditions preferably at a pH from about 1 to about 11. The temperature in salting out is not particularly limited, however is, for example, about 40° C. to about 80° C. and preferably about 50° C. to about 70° C.

The dye represented by the general formula (1) synthesized in the manner described above is obtained in a free acid form or a salt form thereof. The free acid form is obtained, for example, by aciding out. The salt form is obtained, for example, by salting out or by applying a typical salt exchange method of adding a desired organic or inorganic base to the free acid form.

The blending amount of the dye represented by the general formula (1) is not particularly limited; the blending amount of the dye is preferably 2% by weight to 6% by weight with respect to the entire amount of the water-based cyan ink.

The cyan colorant may be composed only of the dye represented by the general formula (1), or may further includes other dye and pigment, etc.

The water and the water blending amount in the water-based cyan ink are similar to the water and the water blending amount in the water-based black ink.

The water-soluble organic solvent and the blending amount of the water-soluble organic solvent in the water-based cyan ink are similar to the water-soluble organic solvent and the blending amount of the water-soluble organic solvent in the water-based black ink.

The water-based cyan ink may further contain a conventionally known additive, as necessary. The additive to be contained in the water-based cyan ink is also similar to the additive to be contained in the water-based black ink.

The water-based cyan ink can be prepared, for example, by uniformly or homogennously mixing a cyan colorant, water, and a water-soluble organic solvent, and optionally other additive component(s) as necessary by a conventionally known method, and then by removing undissolved matters by a filter or the like.

The water-based ink set for ink-jet recording of the present teaching may be composed only of the water-based black ink and the water-based cyan ink, or may be composed to further include another water-based color ink of a color different from the black and cyan inks. As the another water-based color ink is exemplified, for example, by a water-based yellow ink, a water-based magenta ink, a water-based red ink, a water-based green ink, a water-based blue ink, a water-based light ink having a low colorant concentration (water-based light black ink, water-based light cyan ink, water-based light yellow ink, water-based light magenta ink, water-based light red ink, water-based light green ink, water-based light blue ink, etc.), and the like. It is preferable that the water-based ink set of the present teaching includes a water-based yellow ink and a water-based magenta ink so that the ink set is applicable to full color recording.

Next, in the present teaching, the water-based ink set for ink-jet recording can be provided as an ink cartridge. The ink cartridge of the present teaching is, for example, an ink cartridge having accommodating sections for a water-based black ink and a water-based cyan ink respectively, wherein the water-based black ink and the water-based cyan ink are the water-based black ink and the water-based cyan ink constructing the water-based ink set for ink-jet recording of the present teaching. The ink cartridge of the present teaching may further include an accommodating section for the another water-based color ink.

The ink cartridge of the present teaching is preferably an ink cartridge assembly constructed of a plurality of ink cartridges each of which has an accommodating section for a water-based ink of one color. The present teaching, however, is not limited to this. The ink cartridge of the present teaching may be an integrated-type ink cartridge of which inner space is partitioned to define accommodating sections for plurality of color inks. It is allowable to use, for example, a conventionally known body for ink cartridge as the body of the ink cartridge.

The water-based ink set for ink-jet recording of the present teaching has excellent light resistance, ozone resistance and jetting stability of the dye cyan ink, and also has excellent non-aggregation property between the pigment black ink and the dye cyan ink.

Next, explanation will be given about an ink-jet recording method and an ink-jet recording apparatus of the present teaching.

The ink-jet recording method of the present teaching is an ink-jet recording method for performing recording on a recording medium by discharging water-based inks constructing the water-based ink set by the ink-jet system (in the ink-jet manner), wherein the water-based ink set is the water-based ink set for ink-jet recording of the present teaching.

The ink-jet recording apparatus of the present teaching is an ink-jet recording apparatus including an ink-set accommodating section and an ink-jet discharge mechanism, wherein the water-based ink set for ink-jet recording of the present teaching is accommodated in the ink-set accommodating section; and the water-based black ink and the water-based cyan ink constructing the water-based ink set for ink-jet recording of the present teaching are discharged onto the recording medium by the ink discharge mechanism.

The ink-jet recording method of the present teaching can be practiced by, for example, using the ink-jet recording apparatus of the present teaching. The recording includes printing text (character, letter), printing image or picture, and printing, etc.

Figure 1:
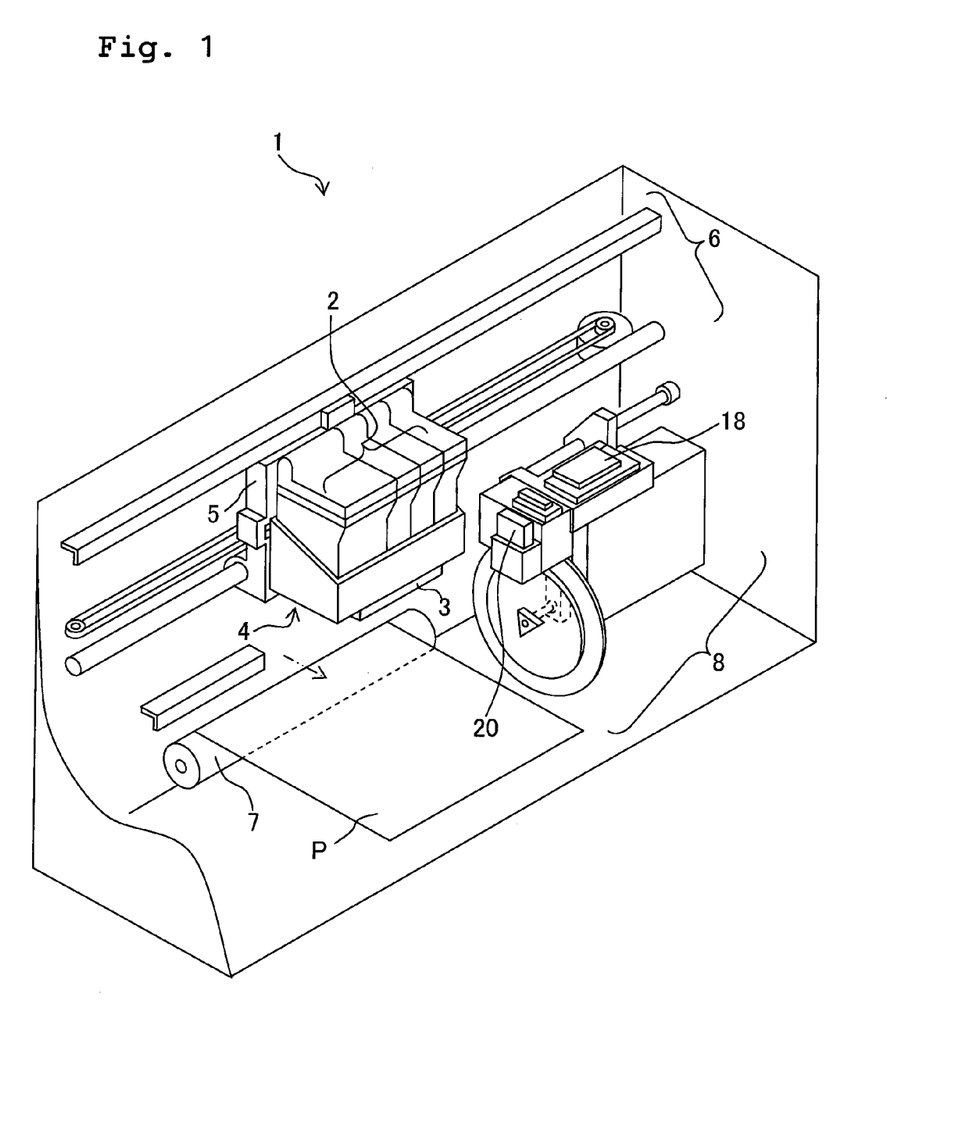
FIG. 1 is a schematic perspective view of exemplary construction of an ink-jet recording apparatus of the present teaching.

An example of the construction of the ink-jet recording apparatus of the present teaching is shown in FIG. 1. As shown in the drawing, an ink-jet recording apparatus 1 includes four ink cartridges 2, an ink-jet discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks respectively, the four colors being black, cyan, yellow and magenta. For example, the water-based black ink and the water-based cyan ink are the water-based black ink and the water-based cyan ink constructing the water-based ink set of the present teaching. It is allowable to use commercially available water inks as the remaining inks other than the water-based black and cyan inks. The ink-jet head 3 disposed on the head unit 4 performs recording on a recording medium P such as a recording sheet (recording paper, recording paper sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The recording sheet P is supplied or fed, for example, from a paper feeding cassette or sheet feeding cassette (not shown) arranged at a side of or at a position below the ink-jet recording apparatus 1. The recording paper P is introduced or guided between the ink-jet head 3 and the platen roller 7. Then, a predetermined recording is performed on the fed or introduced recording paper P with the ink discharged or jetted from the ink jet head 3. Afterwards, the recording medium P on which the recording has been performed is discharged from the ink-jet recording apparatus 1. In FIG. 1, a paper feeding mechanism and a discharging mechanism for the recording medium P are omitted.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink jet head 3 accompanying with the movement (reciprocating movement) of the carriage 5. When the nozzle-formed surface is wiped by the wiper member 20, the water-based ink set of the present teaching does not cause any aggregation of the ink or inks. In FIG. 1, a cap 18 is provided to cover a plurality of nozzles of the ink-jet head 3 which is returned to a reset position upon completion of the recording, so as to prevent the ink from drying.

In the ink-jet recording apparatus, the four ink cartridges may be provided on a plurality of carriages. Alternatively, the ink cartridges may be arranged and fixed inside the ink-jet recording apparatus, rather than being provided on the carriage(s). In such an aspect, for example, the ink cartridges and the head unit which is provided on the carriage are connected with a tube, etc., and the inks are supplied from the ink cartridges to the head unit via the tube.

EXAMPLES

Next, examples of the present teaching will be explained together with comparative examples. Note that the present teaching is not limited and is not restricted to the examples and the comparative examples which will be described below.
(Preparation of Water-Based Black Ink)

Components except for a water dispersion of the self-dispersible carbon black (self-dispersible carbon black water dispersion), which were included in the water-based black ink composition (TABLE 1 and TABLE 2), were mixed uniformly or homogeneously to obtain ink solvents. Subsequently, the ink solvents were each added to the self-dispersible carbon black water dispersion, followed by being mixed uniformly. After that, obtained mixtures were each filtrated through a cellulose acetate membrane filter (pore size 3.00 μm) produced by Toyo Roshi Kaisha, Ltd., and thus water-based black inks Bk1 to Bk3 were obtained.
(Preparation of Water-Based Cyan Ink)

Respective components in the water-based cyan ink composition (TABLE 1 and TABLE 2) were mixed uniformly or homogeneously. After that, obtained mixtures were filtrated through a membrane filter (pore size 0.20 μm) of the hydrophilic polytetrafluoroethylene (PTFE) type produced by Toyo Roshi Kaisha, Ltd. to thereby obtain water-based cyan ink C1 to C10 and C11c to C26c. Note that in TABLE 1 and TABLE 2, dyes (1-A) to (1-E) are compounds represented by the above-described chemical formulae (1-A) to (1-E), respectively; dyes (2-A) to (2-E) are compounds represented by the following chemical formulae (2-A) to (2-E), respectively; dyes (3-A) to (3-C) are compounds represented by the following chemical formulae (3-A) to (3-C), respectively. Further, Pc (Pu) in the chemical formulae (2-A) to (2-E) and (3-A) to (3-C) is copper phthalocyanine nucleus represented by the following general formula (Pc).

(Chemical Formula 2-A)

(2-A)

(Chemical Formula 2-B)

(2-B)

(Chemical Formula 2-C)

(2-C)

(Chemical Formula 2-D)

(2-D)

(Chemical Formula 2-E)

(2-E)

(Chemical Formula 3-A)

(3-A)

(Chemical Formula 3-B)

(3-B)

(Chemical Formula 3-C)

Pc(Cu)(SO₃Na)₃(SO₂NH₂)

(3-C)

(Chemical Formula Pc)

(Pc)

Next, the method for producing the dyes (2-A) to (2-E) is described. The dyes (2-A) to (2-E) can be produced by, for example, introducing a specific substituent to a phthalic acid derivative in advance and by synthesizing copper phthalocyanine from the thus obtained substituted phthalic acid derivative and a copper derivative such as $CuCl_2$ or the like. A method for synthesizing copper phthalocyanine from a phthalic acid derivative and a copper derivative is described, for example, in Japanese Patent Application laid-open No. 2000-303009, etc. Here, the substituted phthalic acid derivative can be produced, for example, by the following reaction scheme.

As a phthalic acid derivative serving as a raw material, for example, it is possible to use substituted phthalonitrile, substituted diiminoisoindoline, substituted phthalic diamide, substituted phthalimide, substituted phthalic acid and its salt, substituted phthalic anhydride, and the like.

A substituent of the substituted phthalic acid derivative is a soluble group or its precursor. The soluble group is a substituent that imparts solubility to a copper phthalocyanine dye. In a case that a soluble group imparts water solubility to a copper phthalocyanine dye, the soluble group is a hydrophilic group. Examples of the hydrophilic group include an ionic hydrophilic group and a substituent substituted by an ionic hydrophilic group. The precursor of the soluble group is a substituent that is capable of being converted into a soluble group through a reaction after a phthalocyanine ring is formed. As a substituent of the substituted phthalic acid derivative, it is preferable to use a substituent selected from the group consisting of —$SO_2R_a$, —$SO_2NR_bR_c$, and —$CO_2R_a$. $R_a$ represents a substituted or unsubstituted alkyl group, $R_b$ represents a hydrogen atom or a substituted or unsubstituted alkyl group, and $R_c$ represents a substituted or unsubstituted alkyl group.

(Reaction Scheme)

Next, the phthalic acid derivatives typified by the aforementioned compounds "a" to "h" and a copper derivative such as $CuCl_2$ or the like are mixed at a molar ratio (copper derivative:phthalic acid derivative) of about 3:1 to about 6:1, and reacted at a temperature in a range from 80° C. to 300° C. in the presence of an organic solvent having the boiling point of not less than 80° C., preferably not less than 130° C. By setting the reaction temperature in the aforementioned range, it is possible to prevent extreme slow down of a reaction speed and decomposition of the phthalocyanine dye to be obtained. The time for the reaction is, for example, about 2 hours to about 20 hours. By setting the reaction time in the aforementioned range, large amount of materials are prevented from being unreacted and the phthalocyanine dye to be obtained is prevented from being decomposed. The reaction may be carried out in the presence of a catalyst such as 1,8-diazabicyclo[5.4.0]-7-undecene (DBU), ammonium molybdate, or the like. Then, an ion-exchange is carried out, for example, according to the following method: the original cation is removed through dialysis; and then a monovalent metal cation is added (for example, an alkali metal hydroxide is added). After completion of the reaction, the reaction product is treated according to an ordinary after-treatment for an organic synthesis reaction, whereby the dyes (2-A) to (2-E) can be obtained.

Next, the method for producing the dyes (3-A) to (3-C) is described. The dyes (3-A) to (3-C) may be produced, for example, by a conventionally known copper phthalocyanine substitution method having, for example, the following steps (A) to (C).

Step (A)

First, a copper phthalocyanine compound is chlorosulfonated with a chlorosulfonating agent. Examples of the chlorosulfonating agent include a mixture of a chlorosulfonic acid and a chlorinating agent (phosphorous oxychloride or phosphorous trichloride); and the like. The molar ratio of the chlorosulfonic acid to the copper phthalocyanine compound (chlorosulfonic acid:copper phthalocyanine compound) is, for example, about 5:1 to about 200:1. The molar ratio of the chlorinating agent to the copper phthalocyanine compound (chlorinating agent:copper phthalocyanine compound) is, for example, about 0.5:1 to about 10:1.

This chlorosulfonation reaction is carried out, for example, at a temperature from about 90° C. to about 180° C. for about 0.5 hours to about 16 hours. Generally, the reaction time for the chlorosulfonation depends on the reaction temperature. The reaction time tends to be short as the reaction temperature is increased, and the reaction time tends to be long as the reaction temperature is decreased. The chlorosulfonation reaction may be carried out at a temperature from about 135° C. to about 145° C. for about 1.5 hours to about 5.0 hours.

The chlorosulfonating agent may contain a sulfuric acid. When the chlorosulfonating agent contains a sulfuric acid, the molar ratio of the sulfuric acid to the copper phthalocyanine compound (sulfuric acid:copper phthalocyanine compound) is about 0.3:1 to about 2:1.

Step (B)

Next, a compound represented by the following structural formula (31) is obtained by condensation reaction of the product obtained in the step (A) and ammonia.

(Chemical Structural Formula 31)

This step is carried out at a reaction temperature from about 0° C. to about 50° C. using about 3% by weight to about 35% by weight of ammonium hydroxide. Generally, the reaction time depends on the reaction temperature. The reaction time tends to be short as the reaction temperature is increased, and the reaction time tends to be long as the reaction temperature is decreased. The condensation reaction may be carried out at a temperature from about 0° C. to about 45° C. for about 0.5 hours to about 24 hours.

Step (C)

Then, $NH_4^+$ in the compound represented by the structural formula (31) obtained in the step (B) is exchanged with a monovalent metal cation, if necessary. This metal cation exchange reaction may be carried out, for example, by the following method: the product obtained in the step (B) is acidified (for example, $NH_4^+$ is exchanged with $H^+$ using a hydrochloric acid), then the original cation is removed through dialysis, and then a monovalent metal cation is added (for example, an alkali metal hydroxide is added). In this manner, the dyes (3-A) to (3-C) can be produced.

Examples 1 to 10 and Comparative Examples 1 to 16

[Construction of Water-Based Ink Sets for Ink-Jet Recording]

The water-based black inks and the water-based cyan inks were combined as shown in TABLE 1 and TABLE 2 to construct the water-based ink sets for ink-jet recording.

[Evaluation of Water-Based Ink Sets for Ink-Jet Recording]

The water-based ink sets for ink-jet recording of the examples and comparative examples were evaluated regarding (a) evaluation of aggregation property, (b) evaluation of jetting stability of the water-based cyan ink (cyan jetting stability), (c) evaluation of light resistance of water-based cyan ink (cyan light resistance), (d) evaluation of ozone resistance of water-based cyan ink (cyan ozone resistance) and (e) overall evaluation, in accordance with the following method. Samples used for (c) evaluation of cyan light resistance and (d) evaluation of cyan ozone resistance were prepared in the following manner.

[Preparation of Samples]

First, the water-based cyan inks constructing the water-based ink sets of the examples and comparative examples were filled in ink cartridges. Then, the ink cartridges were installed in a digital multifunction machine DCP-385C provided with an ink-jet printer produced by Brother Industries, Ltd. Afterwards, a single color gradation sample of each of the water-based cyan inks was printed on a glossy photo paper BP71GA produced by Brother Industries, Ltd., and a single color patch having initial optical density (OD) value of 1.0 was obtained. The initial OD value was measured by using a spectrophotometric colorimetry meter Spectrolino (light source: $D_{65}$, field: 2°, status A) produced by Gretag Macbeth.

(a) Evaluation of Aggregation Property

Figure 2A:
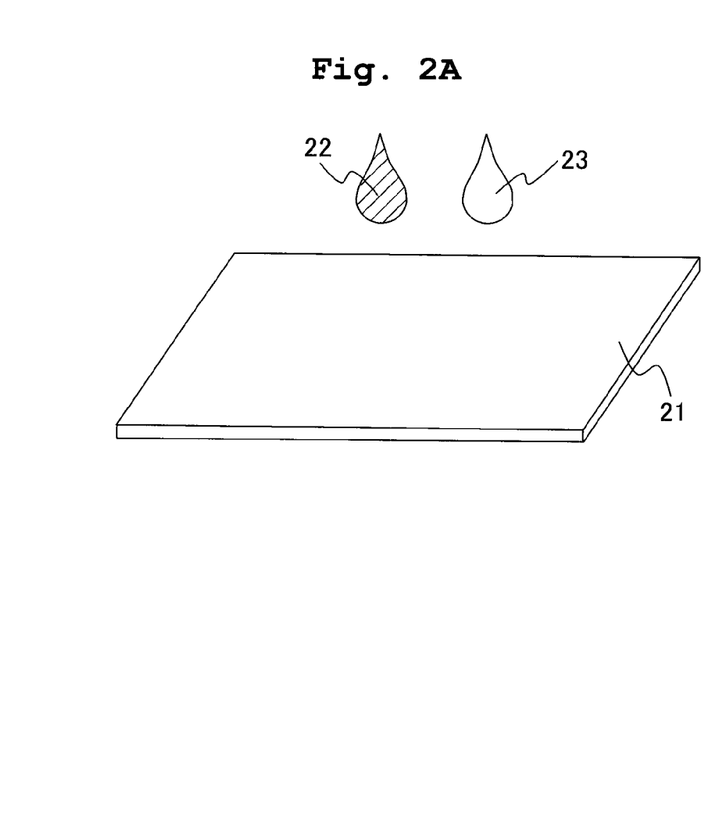
FIGS. 2A and 2B are views explaining a method for evaluating aggregation property in an embodiment of the present teaching.
Figure 2B:
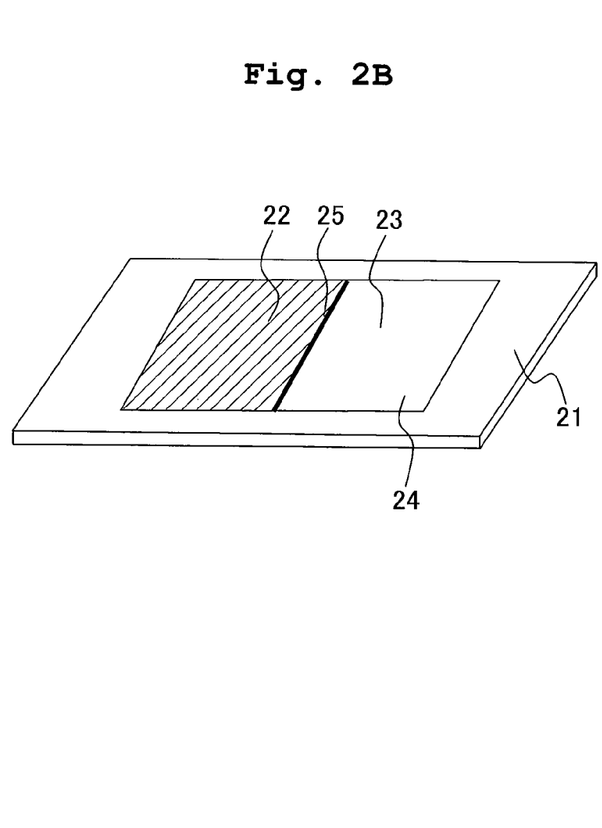

At first, as shown in FIG. 2A, a water-based black ink 22 and a water-based cyan ink 23 of each of the Examples and Comparative Examples were dripped each in an amount of 3 μL onto a slide glass 21 while being separated. Subsequently, as shown in FIG. 2B, the dripped inks were covered with a cover glass 24, and thus the both inks were brought into contact with each other. An interface 25 between the both inks, which was provided on a prepared slide produced as described above, was observed at 200× magnification with an optical microscope. The evaluation was made in accordance with the following evaluation criterion. Note that when the results of the evaluation of aggregation property is satisfactory, it is judged that any aggregation does not occur while the nozzle-formed surface is being wiped by the wiper member and that the water-based ink set is a water-based ink set having the excellent discharge stability.

Evaluation Criteria for Aggregation Property Evaluation

G: No granular aggregated matter was observed at all in the interface 25 between the both inks, or very small (slight) granular aggregated matter was observed in the interface 25.

NG: Granular aggregated matter was observed in the interface 25.

(b) Evaluation of Cyan Jetting Stability

Each of the water-based cyan inks constructing the water-based ink sets of the examples and comparative examples was used to perform continuous recording of hundred million dots (about 30,000 sheets of paper) on "Office Paper W" (recording paper) produced by Fujitsu CoWorCo Ltd. The results of the continuous recording were evaluated in accordance with the following evaluation criterion. Note that the term "un-discharge (non-discharge)" indicates such a state that the nozzles of the ink-jet head are clogged and the water-based cyan ink is not discharged from the nozzles; and that the term "discharge-bending (discharge-deflection)" indicates such a state that a part of the nozzles of the ink-jet head are clogged, and the water-based cyan ink is not discharged perpendicularly to the recording paper, but is discharged obliquely with respect to the recording paper.

Evaluation Criterion for Cyan Discharge Stability

G: Neither un-discharge nor discharge-bending occurred at all during the continuous recording.

NG: Un-discharge or discharge-bending occurred in the continuous recording.

(c) Evaluation of Cyan Light Resistance

A high-energy xenon weather meter SC750-WN produced by Suga Test Instruments Co., Ltd. was used to irradiate a light beam from a xenon lamp for 100 hours onto the single color patch, under the condition of inner-tank temperature: 25° C., inner-tank relative humidity: 50%, and illuminance: 93 klx. Then, the OD value of the single patch after the irradiation was measured in a similar manner as described above. Afterwards, the decreasing rate of the OD value (OD value-decreasing rate) (%) was calculated by the following formula (I), and the cyan light resistance was evaluated in accordance with the following evaluation criterion. Note that as the OD value-decreasing rate is smaller, the degradation (deterioration) of the image quality is smaller, which in turn means to have an excellent cyan light resistance.

$$\text{OD value-decreasing rate (\%)} = \{(X-Y)/X\} \times 100 \qquad (I)$$

X: 1.0 (initial OD value)
Y: OD value after irradiation

Evaluation Criterion for Cyan Light Resistance

G: OD value-decreasing rate was less than 20%.
NG: OD value-decreasing rate was not less than 20%.

(d) Evaluation of Cyan Ozone Resistance

An ozone weather meter OMS-H produced by Suga Test Instruments Co., Ltd. was used to leave the single color patch for 40 hours in a tank, under the condition of ozone concentration: 1 ppm, inner-tank temperature: 24° C., and inner-tank relative humidity: 60%. Then, the OD value of the single patch after being left in the tank was measured in a similar manner as described above. Afterwards, the OD value-decreasing rate (%) was calculated by the following formula (II), and the cyan ozone resistance was evaluated in accordance with the following evaluation criterion. Note that as the OD value-decreasing rate is smaller, the degradation (deterioration) of the image quality is smaller, which in turn means to have an excellent cyan ozone resistance.

$$\text{OD value-decreasing rate (\%)} = \{(X-Y)/X\} \times 100 \qquad (II)$$

X: 1.0 (initial OD value)
Y: OD value after being left in the tank

Evaluation Criterion for Cyan Ozone Resistance
 G: OD value-decreasing rate was less than 20%.
 NG: OD value-decreasing rate was not less than 20%.
(e) Overall Evaluation With respect to the water-based ink sets, the overall evaluation was performed in accordance with the following evaluation criterion based on the results of (a) to (d) described above.

Evaluation Criterion for Overall Evaluation
 G: All of the evaluation results were G.
 NG: Any one of the evaluation results was NG.

The compositions of the water-based ink sets of the examples 1-10 and the evaluation results thereof are shown in TABLE 1. The compositions of the water-based ink sets of the comparative examples 1-16 and the evaluation results thereof are shown in TABLE 2.

Note that in Table 1:
 *1: Sodium polyoxyethylene (3 E.O.) alkyl (C=12, 13) ether sulfate, produced by Lion Corporation, active ingredient amount=28% by weight (parenthesized numerals indicate active ingredient amounts).
 *2: Water dispersion of self-dispersible carbon black modified by carboxyl group, produced by Cabot, carbon black concentration=15% by weight (parenthesized numerals indicate pigment solid content amounts).
 *3: Water dispersion of self-dispersible carbon black modified by sulfo group, produced by Cabot, carbon black concentration=20% by weight (parenthesized numerals indicate pigment solid content amounts).
 *4: Acetylene glycol-based surfactant (ethylene oxide (10 mol) adduct of acetylene diol), produced by Nissin Chemical Industry Co., Ltd.

Note that in Table 2:
 *1: Sodium polyoxyethylene (3 E.O.) alkyl (C=12, 13) ether sulfate, produced by Lion Corporation, active ingredient amount=28% by weight (parenthesized numerals indicate active ingredient amounts).
 *2: Water dispersion of self-dispersible carbon black modified by carboxyl group, produced by Cabot, carbon black concentration=15% by weight (parenthesized numerals indicate pigment solid content amounts).
 *3: Water dispersion of self-dispersible carbon black modified by sulfo group, produced by Cabot, carbon black concentration=20% by weight (parenthesized numerals indicate pigment solid content amounts).
 *4: Acetylene glycol-based surfactant (ethylene oxide (10 mol) adduct of acetylene diol), produced by Nissin Chemical Industry Co., Ltd.
 *5: Prepared by the method described in Published Japanese Translation of PCT International Publication for Patent Application No. 2009-515007; numerals in the table indicate pigment solid content amounts.

TABLE 1

|  |  |  | EXAMPLES | | | | | | |
| --- | --- | --- | --- | --- | --- | --- | --- | --- | --- |
|  |  |  | EX. 1 | EX. 2 | EX. 3 | EX. 4 | EX. 5 | EX. 6 | EX. 7 |
| Water-based cyan ink |  |  | C1 | C2 | C3 | C4 | C5 | C6 | C7 |
| Composition of water-based cyan ink (% by weight) | Dye (1) | Dye (1-A) | 5.0 | — | — | — | — | 5.0 | — |
|  |  | Dye (1-B) | — | 5.0 | — | — | — | — | 5.0 |
|  |  | Dye (1-C) | — | — | 5.0 | — | — | — | — |
|  |  | Dye (1-D) | — | — | — | 5.0 | — | — | — |
|  |  | Dye (1-E) | — | — | — | — | 5.0 | — | — |
|  | glycerol |  | 15.0 | 15.0 | 15.0 | 15.0 | 15.0 | 15.0 | 15.0 |
|  | polyethylene glycol #200 |  | 10.0 | 10.0 | 10.0 | 10.0 | 10.0 | 10.0 | 10.0 |
|  | triethylene glycol-n-butyl ether |  | 3.0 | 3.0 | 3.0 | 3.0 | 3.0 | 3.0 | 3.0 |
|  | SUNNOL (trade name) NL-1430 (*1) |  | 0.2 (0.056) | 0.2 (0.056) | 0.2 (0.056) | 0.2 (0.056) | 0.2 (0.056) | 0.2 (0.056) | 0.2 (0.056) |
|  | water |  | balance | balance | balance | balance | balance | balance | balance |
| Water-based black ink |  |  | Bk1 | Bk1 | Bk1 | Bk1 | Bk1 | Bk2 | Bk2 |
| Composition of water-based black ink (% by weight) | CAB-O-JET (trade name) 300 (*2) |  | 4.0 | 4.0 | 4.0 | 4.0 | 4.0 | — | — |
|  | CAB-O-JET (trade name) 200 (*3) |  | — | — | — | — | — | 4.0 | 4.0 |
|  | glycerol |  | 28.1 | 28.1 | 28.1 | 28.1 | 28.1 | 28.1 | 28.1 |
|  | dipropylene glycol-n-propyl ether |  | 1.0 | 1.0 | 1.0 | 1.0 | 1.0 | 1.0 | 1.0 |
|  | ORFIN (trade name) E1010" (*4) |  | 0.2 | 0.2 | 0.2 | 0.2 | 0.2 | 0.2 | 0.2 |
|  | water |  | balance | balance | balance | balance | balance | balance | balance |
| Evaluation | Aggregation property evaluation |  | G | G | G | G | G | G | G |
|  | Cyan jetting stability evaluation |  | G | G | G | G | G | G | G |
|  | Cyan light resistance evaluation |  | G | G | G | G | G | G | G |
|  | Cyan ozone resistance evaluation |  | G | G | G | G | G | G | G |
|  | Overall evaluation |  | G | G | G | G | G | G | G |

|  |  |  | EXAMPLES | | |
| --- | --- | --- | --- | --- | --- |
|  |  |  | EX. 8 | EX. 9 | EX. 10 |
| Water-based cyan ink |  |  | C8 | C9 | C10 |
| Composition of water-based cyan ink (% by weight) | Dye (1) | Dye (1-A) | — | — | — |
|  |  | Dye (1-B) | — | — | — |
|  |  | Dye (1-C) | 5.0 | — | — |
|  |  | Dye (1-D) | — | 5.0 | — |
|  |  | Dye (1-E) | — | — | 5.0 |
|  | glycerol |  | 15.0 | 15.0 | 15.0 |
|  | polyethylene glycol #200 |  | 10.0 | 10.0 | 10.0 |
|  | triethylene glycol-n-butyl ether |  | 3.0 | 3.0 | 3.0 |
|  | SUNNOL (trade name) NL-1430 (*1) |  | 0.2 (0.056) | 0.2 (0.056) | 0.2 (0.056) |
|  | water |  | balance | balance | balance |

TABLE 1-continued

| | | | | | |
|---|---|---|---|---|---|
| Water-based black ink | | | Bk2 | Bk2 | Bk2 |
| Composition of water-based black ink (% by weight) | CAB-O-JET (trade name) 300 (*2) | | — | — | — |
| | CAB-O-JET (trade name) 200 (*3) | | 4.0 | 4.0 | 4.0 |
| | glycerol | | 28.1 | 28.1 | 28.1 |
| | dipropylene glycol-n-propyl ether | | 1.0 | 1.0 | 1.0 |
| | ORFIN (trade name) E1010" (*4) | | 0.2 | 0.2 | 0.2 |
| | water | | balance | balance | balance |
| Evaluation | Aggregation property evaluation | | G | G | G |
| | Cyan jetting stability evaluation | | G | G | G |
| | Cyan light resistance evaluation | | G | G | G |
| | Cyan ozone resistance evaluation | | G | G | G |
| | Overall evaluation | | G | G | G |

TABLE 2

| | | | COMPARATIVE EXAMPLES | | | | | |
|---|---|---|---|---|---|---|---|---|
| | | | COM. 1 | COM. 2 | COM. 3 | COM. 4 | COM. 5 | COM. 6 |
| Water-based cyan ink | | | C11c | C12c | C13c | C14c | C15c | C16c |
| Composition of water-based cyan ink (% by weight) | Dye (1) | Dye (1-A) | 5.0 | — | — | — | — | — |
| | | Dye (1-E) | — | 5.0 | — | — | — | — |
| | Dye (2) | Dye (2-A) | — | — | 5.0 | — | — | — |
| | | Dye (2-B) | — | — | — | 5.0 | — | — |
| | | Dye (2-C) | — | — | — | — | 5.0 | — |
| | | Dye (2-D) | — | — | — | — | — | 5.0 |
| | | Dye (2-E) | — | — | — | — | — | — |
| | Dye (3) | Dye (3-A) | — | — | — | — | — | — |
| | | Dye (3-B) | — | — | — | — | — | — |
| | | Dye (3-C) | — | — | — | — | — | — |
| | C.I. Direct Blue 199 | | — | — | — | — | — | — |
| | C.I. Direct Blue 86 | | — | — | — | — | — | — |
| | C.I. Acid Blue 9 | | — | — | — | — | — | — |
| | C.I. Acid Blue 74 | | — | — | — | — | — | — |
| | Glycerol | | 15.0 | 15.0 | 15.0 | 15.0 | 15.0 | 15.0 |
| | polyethylene glycol #200 | | 10.0 | 10.0 | 10.0 | 10.0 | 10.0 | 10.0 |
| | triethylene glycol-n-butyl ether | | 3.0 | 3.0 | 3.0 | 3.0 | 3.0 | 3.0 |
| | SUNNOL (trade name) NL-1430 (*1) | | 0.2 (0.056) | 0.2 (0.056) | 0.2 (0.056) | 0.2 (0.056) | 0.2 (0.056) | 0.2 (0.056) |
| | water | | balance | balance | balance | balance | balance | balance |
| Water-based black ink | | | Bk3 | Bk3 | Bk1 | Bk1 | Bk1 | Bk1 |
| Composition of water-based black ink (% by weight) | CAB-O-JET (trade name) 300 (*2) | | — | — | 4.0 | 4.0 | 4.0 | 4.0 |
| | CAB-O-JET (trade name) 200 (*3) | | — | — | — | — | — | — |
| | water dispersion of self-dispersible carbon black modified by phosphate group (*5) | | 4.0 | 4.0 | — | — | — | — |
| | glycerol | | 28.1 | 28.1 | 28.1 | 28.1 | 28.1 | 28.1 |
| | dipropylene glycol-n-propyl ether | | 1.0 | 1.0 | 1.0 | 1.0 | 1.0 | 1.0 |
| | ORFIN (trade name) E1010" (*4) | | 0.2 | 0.2 | 0.2 | 0.2 | 0.2 | 0.2 |
| | water | | balance | balance | balance | balance | balance | balance |
| Evaluation | Aggregation property evaluation | | NG | NG | G | G | G | G |
| | Cyan jetting stability evaluation | | G | G | NG | NG | NG | NG |
| | Cyan light resistance evaluation | | G | G | G | G | G | G |
| | Cyan ozone resistance evaluation | | G | G | G | G | G | G |
| | Overall evaluation | | NG | NG | NG | NG | NG | NG |

| | | | COMPARATIVE EXAMPLES | | | | | |
|---|---|---|---|---|---|---|---|---|
| | | | COM. 7 | COM. 8 | COM. 9 | COM. 10 | COM. 11 | COM. 12 |
| Water-based cyan ink | | | C17c | C18c | C19c | C20c | C21c | C22c |
| Composition of water-based cyan ink (% by weight) | Dye (1) | Dye (1-A) | — | — | — | — | — | — |
| | | Dye (1-E) | — | — | — | — | — | — |
| | Dye (2) | Dye (2-A) | — | — | — | — | — | — |
| | | Dye (2-B) | — | — | — | — | — | — |
| | | Dye (2-C) | — | — | — | — | — | — |
| | | Dye (2-D) | — | — | — | — | — | — |
| | | Dye (2-E) | 5.0 | — | — | — | — | — |
| | Dye (3) | Dye (3-A) | — | 5.0 | — | — | — | — |
| | | Dye (3-B) | — | — | 5.0 | — | — | — |
| | | Dye (3-C) | — | — | — | 5.0 | — | — |
| | C.I. Direct Blue 199 | | — | — | — | — | 5.0 | 5.0 |
| | C.I. Direct Blue 86 | | — | — | — | — | — | — |
| | C.I. Acid Blue 9 | | — | — | — | — | — | — |
| | C.I. Acid Blue 74 | | — | — | — | — | — | — |
| | Glycerol | | 15.0 | 15.0 | 15.0 | 15.0 | 15.0 | 15.0 |
| | polyethylene glycol #200 | | 10.0 | 10.0 | 10.0 | 10.0 | 10.0 | 10.0 |

TABLE 2-continued

|  |  |  |  |  |  |  |  |
|---|---|---|---|---|---|---|---|
|  | triethylene glycol-n-butyl ether | 3.0 | 3.0 | 3.0 | 3.0 | 3.0 | 3.0 |
|  | SUNNOL (trade name) NL-1430 (*1) | 0.2 (0.056) | 0.2 (0.056) | 0.2 (0.056) | 0.2 (0.056) | 0.2 (0.056) | 0.2 (0.056) |
|  | water | balance | balance | balance | balance | balance | balance |
| Water-based black ink |  | Bk1 | Bk1 | Bk1 | Bk1 | Bk1 | Bk2 |
| Composition of water-based black ink (% by weight) | CAB-O-JET (trade name) 300 (*2) | 4.0 | 4.0 | 4.0 | 4.0 | 4.0 | — |
|  | CAB-O-JET (trade name) 200 (*3) | — | — | — | — | — | 4.0 |
|  | water dispersion of self-dispersible carbon black modified by phosphate group (*5) | — | — | — | — | — | — |
|  | glycerol | 28.1 | 28.1 | 28.1 | 28.1 | 28.1 | 28.1 |
|  | dipropylene glycol-n-propyl ether | 1.0 | 1.0 | 1.0 | 1.0 | 1.0 | 1.0 |
|  | ORFIN (trade name) E1010" (*4) | 0.2 | 0.2 | 0.2 | 0.2 | 0.2 | 0.2 |
|  | water | balance | balance | balance | balance | balance | balance |
| Evaluation | Aggregation property evaluation | G | G | G | G | NG | NG |
|  | Cyan jetting stability evaluation | NG | G | G | G | G | G |
|  | Cyan light resistance evaluation | G | G | G | G | G | G |
|  | Cyan ozone resistance evaluation | G | NG | NG | NG | NG | NG |
|  | Overall evaluation | NG | NG | NG | NG | NG | NG |

|  |  | COMPARATIVE EXAMPLES | | | |
|---|---|---|---|---|---|
|  |  | COM. 13 | COM. 14 | COM. 15 | COM. 16 |
| Water-based cyan ink |  | C23c | C24c | C25c | C26c |
| Composition of water-based cyan ink (% by weight) | Dye (1) Dye (1-A) | — | — | — | — |
|  | Dye (1-E) | — | — | — | — |
|  | Dye (2) Dye (2-A) | — | — | — | — |
|  | Dye (2-B) | — | — | — | — |
|  | Dye (2-C) | — | — | — | — |
|  | Dye (2-D) | — | — | — | — |
|  | Dye (2-E) | — | — | — | — |
|  | Dye (3) Dye (3-A) | — | — | — | — |
|  | Dye (3-B) | — | — | — | — |
|  | Dye (3-C) | — | — | — | — |
|  | C.I. Direct Blue 199 | — | — | — | — |
|  | C.I. Direct Blue 86 | 5.0 | — | — | — |
|  | C.I. Acid Blue 9 | — | 5.0 | 5.0 | — |
|  | C.I. Acid Blue 74 | — | — | — | 5.0 |
|  | Glycerol | 15.0 | 15.0 | 15.0 | 15.0 |
|  | polyethylene glycol #200 | 10.0 | 10.0 | 10.0 | 10.0 |
|  | triethylene glycol-n-butyl ether | 3.0 | 3.0 | 3.0 | 3.0 |
|  | SUNNOL (trade name) NL-1430 (*1) | 0.2 (0.056) | 0.2 (0.056) | 0.2 (0.056) | 0.2 (0.056) |
|  | water | balance | balance | balance | balance |
| Water-based black ink |  | Bk1 | Bk1 | Bk2 | Bk1 |
| Composition of water-based black ink (% by weight) | CAB-O-JET (trade name) 300 (*2) | 4.0 | 4.0 | — | 4.0 |
|  | CAB-O-JET (trade name) 200 (*3) | — | — | 4.0 | — |
|  | water dispersion of self-dispersible carbon black modified by phosphate group (*5) | — | — | — | — |
|  | glycerol | 28.1 | 28.1 | 28.1 | 28.1 |
|  | dipropylene glycol-n-propyl ether | 1.0 | 1.0 | 1.0 | 1.0 |
|  | ORFIN (trade name) E1010" (*4) | 0.2 | 0.2 | 0.2 | 0.2 |
|  | water | balance | balance | balance | balance |
| Evaluation | Aggregation property evaluation | NG | NG | NG | NG |
|  | Cyan jetting stability evaluation | G | G | G | G |
|  | Cyan light resistance evaluation | G | NG | NG | NG |
|  | Cyan ozone resistance evaluation | NG | NG | NG | NG |
|  | Overall evaluation | NG | NG | NG | NG |

As shown in TABLE 1, the water-based ink sets of Examples 1 to 10 showed excellent results in all of the evaluations of aggregation, cyan discharge stability, cyan light resistance and cyan ozone resistance.

On the other hand, as shown in TABLE 2, the water-based ink sets of the comparative examples 1 and 2 showed inferior results in the evaluation of aggregation, even though the dye represented by the general formula (1) was used in the water-based cyan ink. The reason for this is considered because the self-dispersible carbon black modified by phosphate group was used in the water-based black ink, rather than using the self-dispersible carbon black modified by at least one of the carboxyl group and the sulfo group.

The water-based ink sets of the comparative examples 3 to 7 showed inferior results in the evaluation of cyan discharge stability. The reason for this is considered because the cyan dyes contained in the water-based cyan inks were dyes (2-A) to (2-E), rather than the dye represented by the general formula (1).

The water-based ink sets of the comparative examples 8 to 10 showed inferior results in the evaluation of cyan ozone resistance. The reason for this is considered because the cyan dyes contained in the water-based cyan inks were dyes (3-A) to (3-C), rather than the dye represented by the general formula (1).

The water-based ink sets of the comparative examples 11 to 13 showed inferior results in the evaluations of aggregation and cyan ozone resistance. The reason for this is considered because the colorant contained in each of the water-based cyan inks was C.I. Direct Blue 199 or C. I. Direct Blue 86, rather than the dye represented by the general formula (1).

The water-based ink sets of the comparative examples 14 to 16 showed inferior results in the evaluations of aggregation, cyan light resistance and cyan ozone resistance. The reason for this is considered because the colorant contained in each of the water-based cyan inks was C.I. Acid Blue 9 or C. I. Acid Blue 74, rather than the dye represented by the general formula (1).

As describe above, the water-based ink set of the present teaching has excellent light resistance, ozone resistance and jetting stability of the cyan ink, and also has excellent non-aggregation property between the pigment black ink and the dye cyan ink. The usage of water-based ink set of the present teaching is not particularly limited; and the water-based ink set is widely applicable to a variety of kinds of ink-jet recording.

What is claimed is:

1. A water-based ink set for ink jet recording, comprising:
a water-based black ink containing a black colorant, water, and a water-soluble organic solvent; and
a water-based cyan ink containing a cyan colorant, water, and a water-soluble organic solvent;
wherein the black colorant includes a self-dispersible carbon black modified by at least one of a carboxyl group and a sulfo group; and
the cyan colorant includes a dye represented by general formula (I):

(1)

-continued in the general formula (I), each of rings $A_1$, $A_2$ and $A_3$ is a benzene ring, 2,3-pyridine ring or 3,2-pyridine ring;
at least one of the rings $A_1$, $A_2$ and $A_3$ is the 2,3-pyridine ring or the 3,2-pyridine ring, and the rings $A_1$, $A_2$ and $A_3$ are identical with or different from one another;
"a" satisfies $0 \le a \le 4$, "b" satisfies $0 \le b \le 4$ and "c" satisfies $0 \le c \le 4$, and a sum of "a", "b", "c" satisfies $0 \le a+b+c \le 4$;
"z" is an integer satisfying $1 \le z \le 3$; and
$R_0$ is a straight chain alkyl group having 1 to 6 carbon atoms.

2. The water-based ink set for ink-jet recording to claim 1, wherein the dye represented by the general formula (I) is contained at 2% by weight to 6% by weight in the water-based cyan ink.

3. The water-based ink set for ink-jet recording to claim 1, wherein a pigment solid content of the self-dispersible carbon black modified by at least one of the carboxyl group and the sulfo group is 0.1% by weight to 20% by weight of the water-based black ink.

4. An ink-jet recording method for performing recording on a recording medium comprising discharging, onto the recording medium, the water-based black ink and the water-based cyan ink of the water-based ink set for ink-jet recording as defined in claim 1.

5. An ink-jet recording apparatus which performs recording on a recording medium comprising:
an ink-set accommodating section which accommodates the water-based ink set for ink jet recording as defined in claim 1; and
an ink discharge mechanism which discharges, onto the recording medium, each of the water-based black ink and the water-based cyan ink of the water-based ink set for ink-jet recording.

* * * * *